(No Model.) 2 Sheets—Sheet 1.

J. T. TRORY.
BONE BLACK KILN.

No. 523,248. Patented July 17, 1894.

WITNESSES:
C. E. Whitney.
W. J. Morgan

INVENTOR:
James T. Trory
By A. P. Thayer
atty.

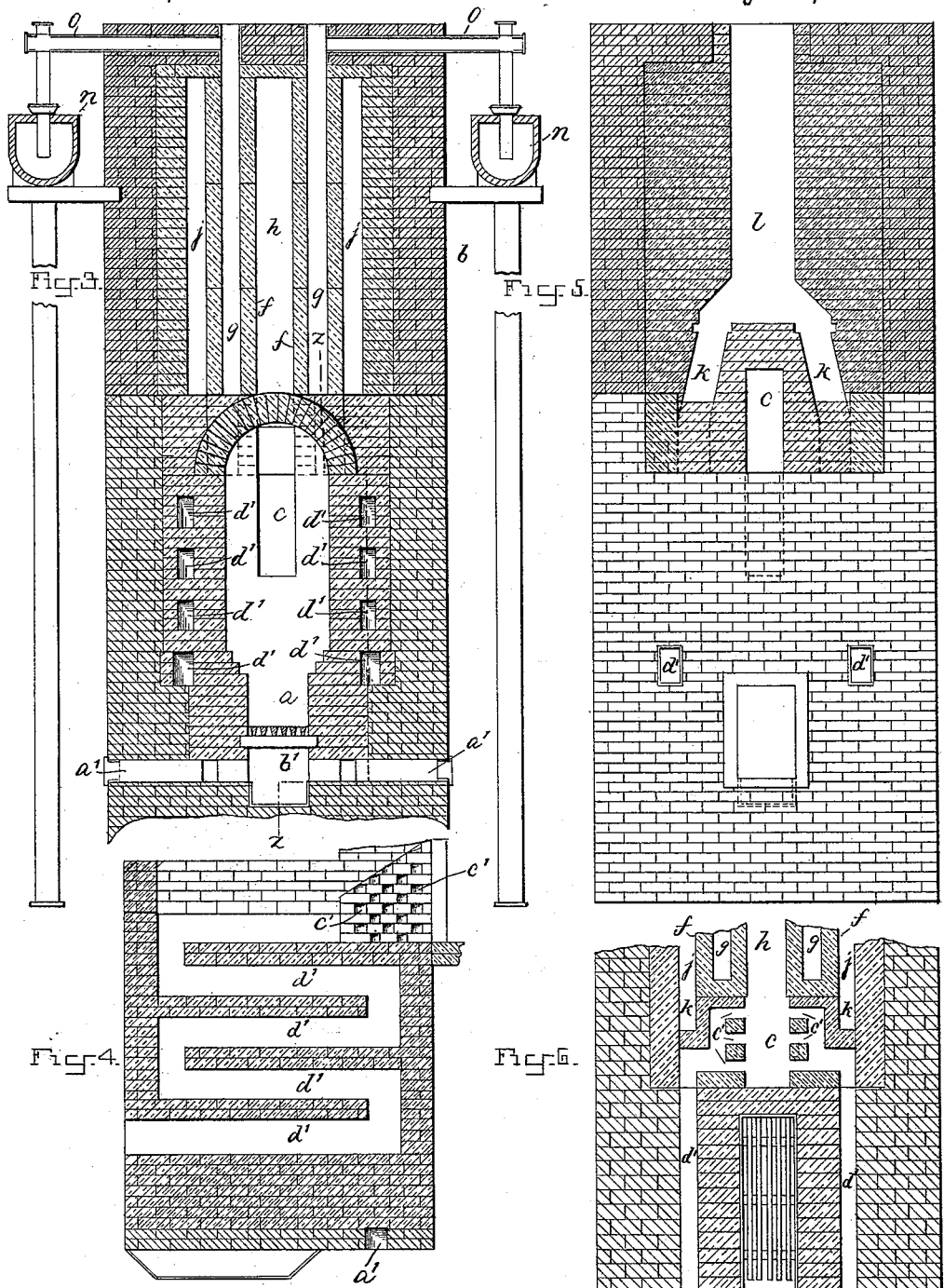

UNITED STATES PATENT OFFICE.

JAMES T. TRORY, OF BROOKLYN, NEW YORK.

BONE-BLACK KILN.

SPECIFICATION forming part of Letters Patent No. 523,248, dated July 17, 1894.

Application filed February 6, 1893. Serial No. 461,293. (No model.)

*To all whom it may concern:*

Be it known that I, JAMES T. TRORY, a citizen of the United States, and a resident of Brooklyn, in the county of Kings and State of New York, have invented certain new and useful Improvements in Bone-Black Kilns, of which the following is a specification.

My invention relates to the construction of kilns for burning bones and it consists essentially in an improved construction of the retorts whereby they are less liable to crack and are more durable in service, also more efficient and so that larger capacity may be had in a given space and they may operate continuously all as hereinafter fully described reference being made to the accompanying drawings, in which—

Figure 1:
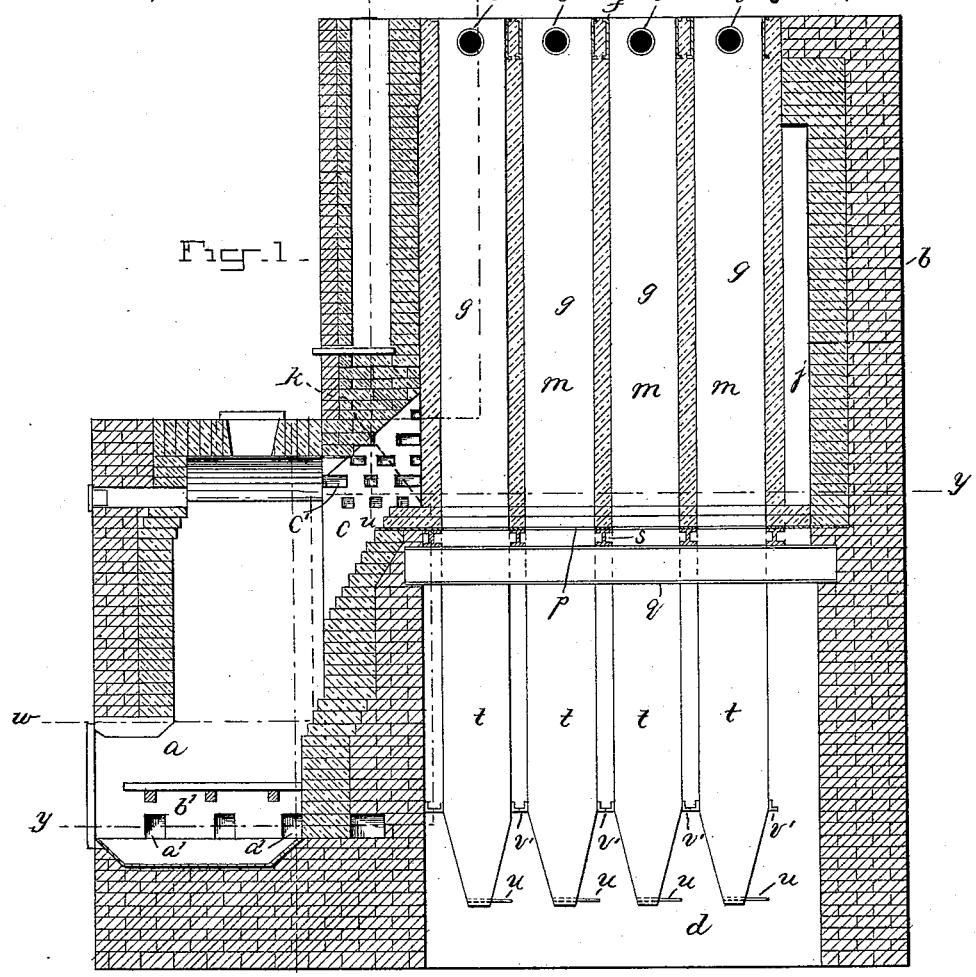
Figure 2:
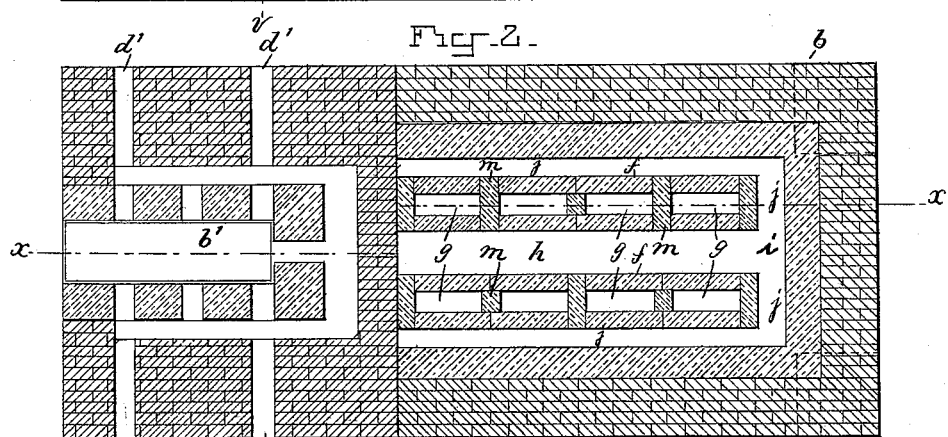

Figure 1, is a sectional elevation of the improved kiln from front to back on the line $x$ $x$, of Fig. 2. Fig. 2, is a horizontal section on line $y$ $y$, Fig. 1. Fig. 3, is a sectional elevation on line $v$ $v$, Fig. 1. Fig. 4, is a section of part of the kiln on line $z$ $z$, Fig. 3. Fig. 5, is partly a front elevation and partly a section on line $u$ $u$, Fig. 1, and Fig. 6, is a horizontal section of part of the kiln on line $w$, $y$, Fig. 1.

I provide a furnace $a$ at the front of the structure a retort chamber $b$, back of the furnace and at a suitable height for the heat products from the top of the furnace to enter the retort chamber near the bottom through the flue $c$, and a cooling and discharging chamber $d$, beneath the retort chamber, and I provide two or more subdivided retorts $f$, in said chamber comprising any approved number of separate divisions $g$, separated by partitions $m$, each constituting the equivalent of an individual retort, the said subdivided retorts being placed apart from each other at the middle of the retort chamber $b$, a distance equal to the width of the flue $c$, and leaving a vertical flue space $h$, communicating therewith and extending the length and height of the said chamber $b$, and dividing at $i$, into other return flue spaces $j$, provided between the other sides of the retorts and the side walls of the chamber $b$, and discharging at $k$ dotted in Fig. 1, into the chimney $l$ so that the heat makes the circuit of the retorts in an effective manner and by discharging from the chamber $b$, at the bottom its flow through the flues $h$ and $j$ is retarded and distributed, its time of action lengthened and its effect increased above what it would be if discharged at the upper part of the chamber.

I build the retorts of fire brick as shown using the most effective cement and placing the bricks with great care to insure good tight joints, and I find in practice that, besides the advantage of a larger capacity of retort space they are much less liable to crack than the fire clay retorts are. At the upper end each individual retort is connected with a trough $n$ by a pipe $o$, for the escape of the ammoniacal gas as usual in such retorts.

The retorts rest on the floor plate $p$ supported by the beams $q$ and $s$. Under each retort space $g$ is a sheet metal receiver $t$, pendent in the cooling chamber $d$ with unobstructed inlet from the retort, for receiving the charred bone when sufficiently burned and holding it for cooling, each charge falling freely thereinto, on withdrawal of the previously burned and cooled charge to be discharged at the proper time by opening a gate or valve, at the bottom of the receiver, as a slide $u$. These receivers are supported principally by the bars $v'$, but may also be fastened in any approved way at the upper ends to beams $s$. Each receiver is surrounded by an air space for the circulation of air to facilitate cooling.

The furnace walls are constructed with air inlet passages $a'$ through the side opening into the ash pit $b'$ below the grate for heating the air by the heat absorbed in the walls and provision is also made for a regenerative supply of air through the inlets $c'$ into the hot gases entering the retort chamber, the air being caused to traverse the side walls in the zig-zag passages $d'$ to be thoroughly heated before reaching said inlets $c'$, and being especially heated at the said inlets which consist of numerous small passages surrounded by the highly heated fire bricks and distributing the air in small currents so as to be heated much more than if admitted through larger and less numerous passages.

The retorts are open at the top for charging in the bones to be burned and will be closed with luted caps of fire clay as usual when charged.

I claim—

1. In a bone-black kiln the combination of a furnace, a laterally placed retort chamber, two series of subdivided retorts in said chamber, heat inlet and conducting passages into, laterally along between the series of retorts, and returning around outside of said series of retorts respectively, and outward therefrom near the lower portion of the chamber substantially as described.

2. The combination with the retort chamber, of two retorts each comprising a brick and cement structure divided by partitions into a series of separate spaces, said retorts placed side by side with a flue space between them open at one end near the bottom to the upper portion of the furnace chamber, and return flues outside communicating with discharge passages into the chimney through the side of the said chamber near the bottom substantially as described.

3. The combination of the furnace, a laterally placed retort chamber constituting a heating flue communicating with the top of the furnace and the side of the retort chamber at the bottom thereof, and the series of regenerative air heating inlets in the sides of the said flue substantially as described.

Signed at New York city, in the county and State of New York, this 6th day of December, A. D. 1892.

JAMES T. TRORY.

Witnesses:
W. J. MORGAN,
C. E. WHITNEY.